(12) United States Patent
Shimizu

(10) Patent No.: US 12,460,735 B2
(45) Date of Patent: Nov. 4, 2025

(54) SOLENOID VALVE DEVICE

(71) Applicant: NIDEC POWERTRAIN SYSTEMS CORPORATION, Kanagawa (JP)

(72) Inventor: Hiroki Shimizu, Kanagawa (JP)

(73) Assignee: NIDEC POWERTRAIN SYSTEMS CORPORATION, Kanagawa (JP)

( * ) Notice: Subject to any disclaimer, the term of this patent is extended or adjusted under 35 U.S.C. 154(b) by 53 days.

(21) Appl. No.: 18/613,115

(22) Filed: Mar. 22, 2024

(65) Prior Publication Data
US 2024/0328529 A1    Oct. 3, 2024

(30) Foreign Application Priority Data

Mar. 29, 2023 (JP) ................................ 2023-053746

(51) Int. Cl.
*F16K 31/06* (2006.01)
*F16K 27/02* (2006.01)

(52) U.S. Cl.
CPC ........ *F16K 31/0655* (2013.01); *F16K 27/029* (2013.01)

(58) Field of Classification Search
None
See application file for complete search history.

(56) References Cited

U.S. PATENT DOCUMENTS

| | | | | |
|---|---|---|---|---|
| 2,980,139 | A * | 4/1961 | Lynn | F16K 31/0689 |
| | | | | 137/625.5 |
| 6,345,870 | B1 * | 2/2002 | Linkner, Jr. | F16K 31/0693 |
| | | | | 303/119.2 |
| 7,575,218 | B2 * | 8/2009 | Speer | B60T 8/363 |
| | | | | 251/129.02 |
| 11,248,715 | B1 * | 2/2022 | Janssen | F16K 27/029 |
| 11,603,946 | B2 | 3/2023 | Nakanishi et al. | |
| 11,802,635 | B2 | 10/2023 | Kuramochi et al. | |
| 2019/0085999 | A1 * | 3/2019 | Chen | F16K 31/0655 |
| 2020/0408318 | A1 * | 12/2020 | Chen | F16K 31/0658 |

FOREIGN PATENT DOCUMENTS

JP        2021120565 A    8/2021

* cited by examiner

*Primary Examiner* — Matthew W Jellett
(74) *Attorney, Agent, or Firm* — HAUPTMAN HAM, LLP

(57) ABSTRACT

A solenoid valve device includes a nozzle body housing a valve body that opens and closes a suction path and a discharge path connected to each other via an opening, and a solenoid that drives the valve body in an axial direction. The nozzle body includes a tubular member having an opening on one side in the axial direction. The other side in the axial direction of the valve body is supported by the tubular member and movable in the axial direction. The valve body includes, on one side in the axial direction of the valve body, an open and close part that opens and closes the opening. The valve body includes, between an end on the one side and an end on the other side in the axial direction of the valve body, an opening open and close part that opens and closes the opening of the tubular member.

7 Claims, 5 Drawing Sheets

SOLENOID VALVE DEVICE

CROSS-REFERENCE TO RELATED APPLICATIONS

The present invention claims priority under 35 U.S.C. § 119 to Japanese Patent Application No. 2023-053746 filed on Mar. 29, 2023, the entire content of which is incorporated herein by reference.

FIELD OF THE INVENTION

The technology of the present disclosure relates to a solenoid valve device.

BACKGROUND

In an engine for an automobile, gas (blow-by gas) that has flown from a combustion chamber into a crankcase via a gap between piston rings or the like is introduced into an intake pipeline using a dedicated pipe for combustion processing by being reintroduced into the combustion chamber.

A solenoid valve device that opens and closes a dedicated pipe for switching between passage and interruption of the blow-by gas is provided. A solenoid valve device includes a solenoid and a valve body. The valve body is provided with a guide portion, and the valve body slides on an inner peripheral surface of a valve body housing portion via the guide portion by energization of the solenoid.

The blow-by gas introduced into the intake pipeline includes mist of lubricating oil in the crankcase and other incomplete combustion products. Such oil mist or incomplete combustion products may form deposits (deposited materials) in the intake pipeline of the engine.

In the solenoid valve device, a gap is required between the inner peripheral surface of the valve body housing portion and the tip of the guide portion in order to slide the valve body. Therefore, when the blow-by gas is introduced into the intake pipe line via the solenoid valve device, a small deposit flows into the solenoid of the solenoid valve device and is sandwiched between the guide portion and the inner wall of the valve body housing portion to inhibit the movement of the valve body.

SUMMARY

An exemplary solenoid valve device according to a first aspect of the technology of the present disclosure includes: a nozzle body including a suction side flow path and a discharge side flow path, and including a valve body housing portion that houses a valve body, the valve body opening and closing the suction side flow path and the discharge side flow path; and a solenoid that drives the valve body in an axial direction. The solenoid includes a plunger that moves in the axial direction by excitation of a coil. The nozzle body includes a tubular valve body holding member including an opening on one side in the axial direction. The other side in the axial direction of the valve body is supported movably in the axial direction by the tubular valve body holding member. The suction side flow path and the discharge side flow path are connected to each other via a flow path opening. The valve body includes, on one side in the axial direction of the valve body, a flow path open and close part that opens and closes the flow path opening. The valve body includes, between one side and the other side in the axial direction of the valve body, an opening open and close part that opens and closes the opening of the tubular valve body holding member.

The above and other elements, features, steps, characteristics and advantages of the present disclosure will become more apparent from the following detailed description of the preferred embodiments with reference to the attached drawings.

DETAILED DESCRIPTION

Hereinafter, an embodiment of the technology of the present disclosure will be described with reference to the drawings.

In the following description, three axes orthogonal to each other are set as an X-axis, a Y-axis, and a Z-axis for convenience of description. As an example, an XY-plane including the X-axis and the Y-axis is horizontal, and the Z-axis is vertical.

Further, an X-axis direction is an "axial direction (axis O1 direction)", a radial direction centered on an axis O1 is referred to as a "radial direction", and a circumferential direction centered on the axis O1 is referred to as a "circumferential direction".

Then, the positive side in the X-axis direction corresponds to "one side in the axis O direction", and the negative side in the X-axis direction corresponds to "the other side in the axis O direction".

In the present specification, a vertical direction, a horizontal direction, an upper side, and a lower side are terms used simply to describe a relative positional relation of each part. Therefore, an actual positional relation and the like of each part may be different from a positional relation and the like indicated by these terms.

Figure 1:
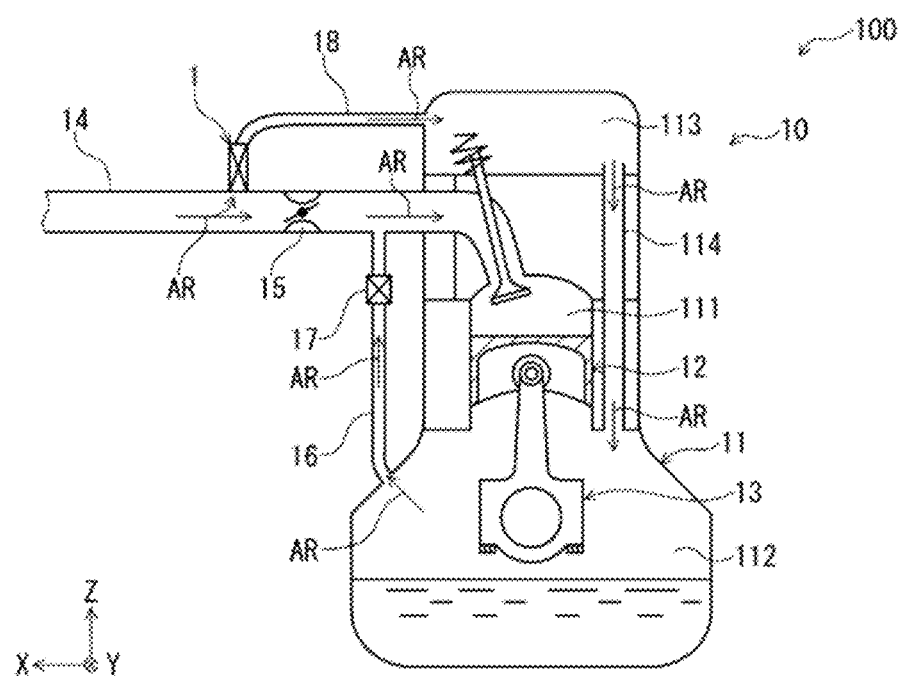
FIG. 1 is a diagram illustrating an example of a use state (open state) of a solenoid valve device of the technology of the present disclosure.
Figure 2:
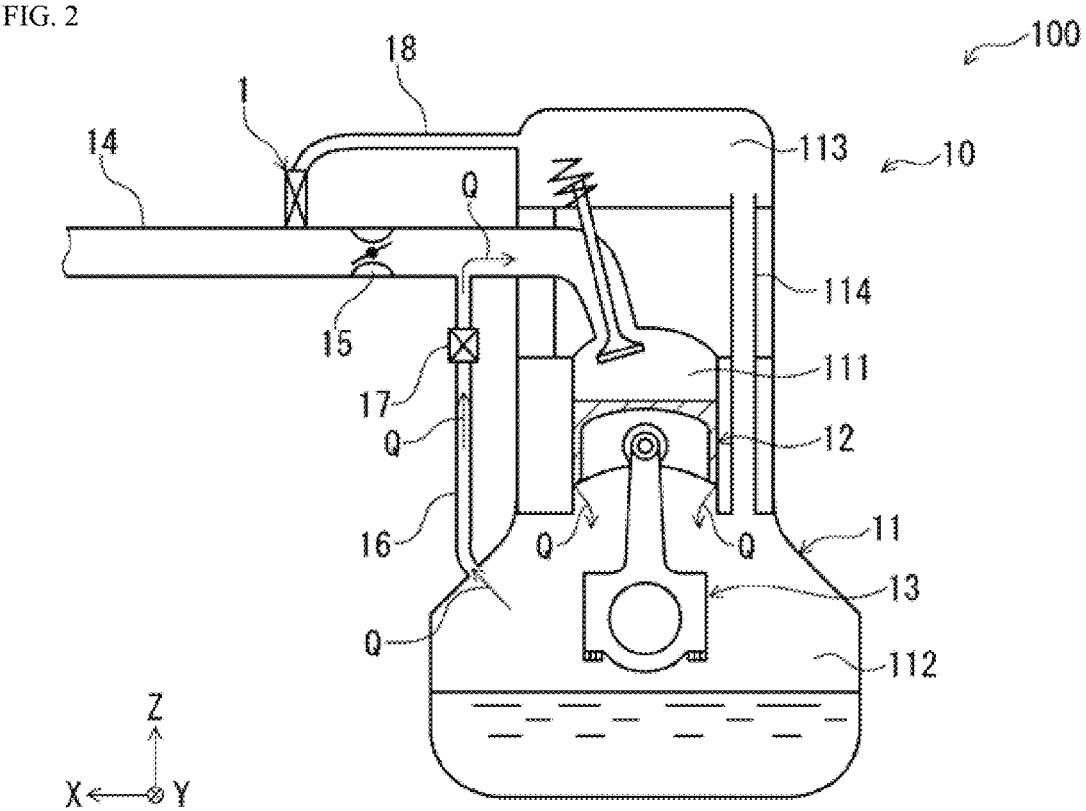
FIG. 2 is a diagram illustrating an example of a use state (closed state) of a solenoid valve device of the technology of the present disclosure.
Figure 3A:
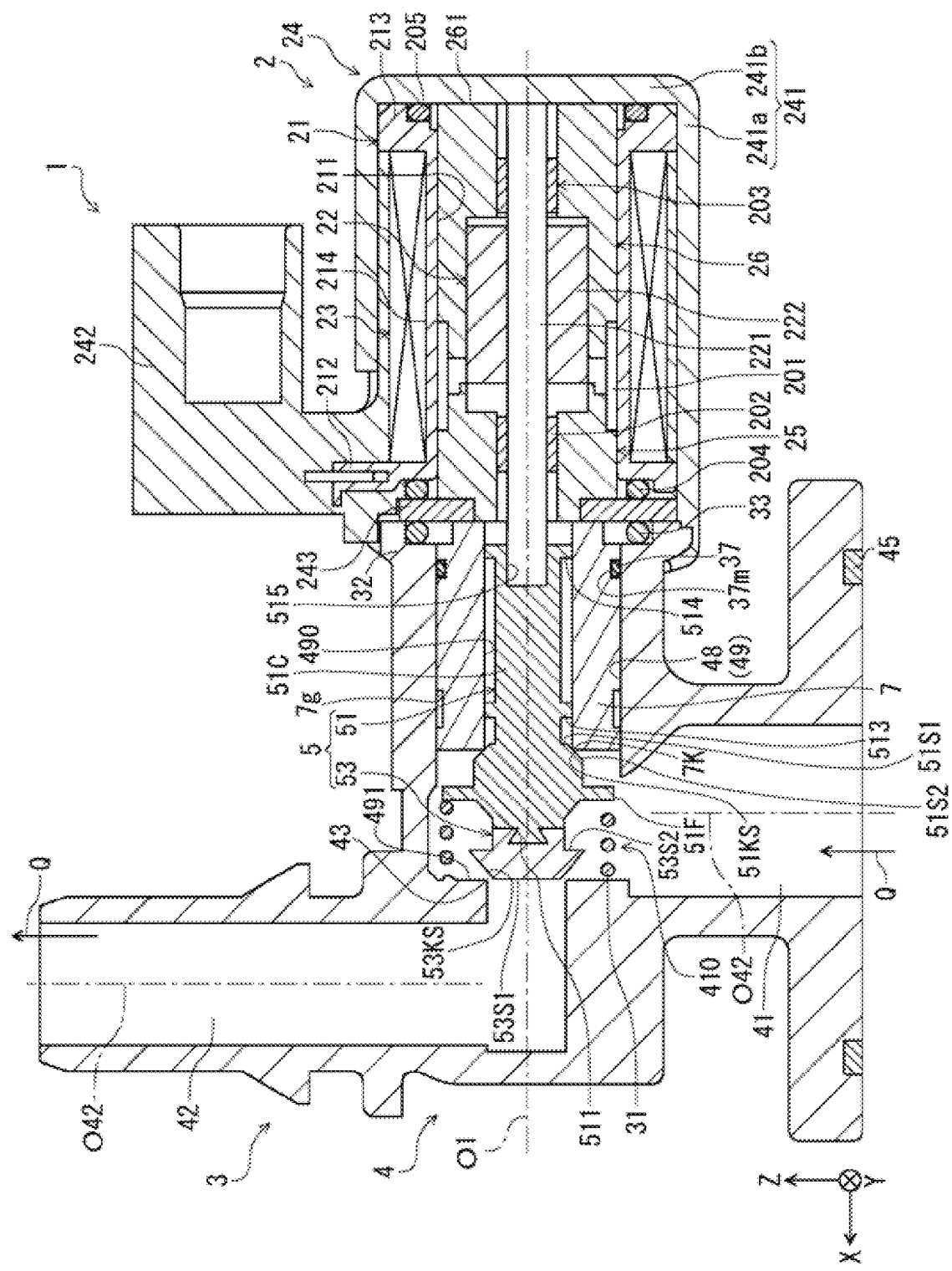
FIG. 3A is a cross-sectional view (open state) illustrating an embodiment of the solenoid valve device of the technology of the present disclosure.
Figure 3B:
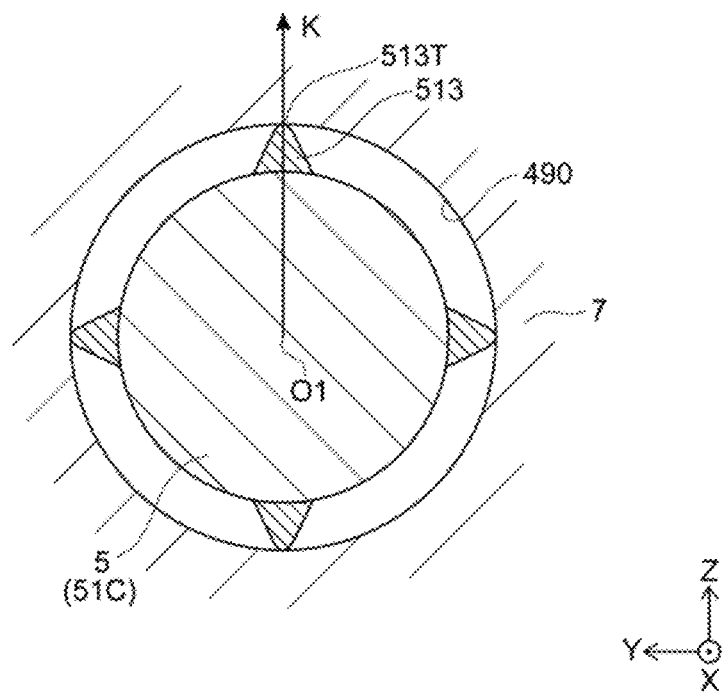
FIG. 3B is a cross-sectional view illustrating a cross-sectional shape of a first guide portion.
Figure 4:
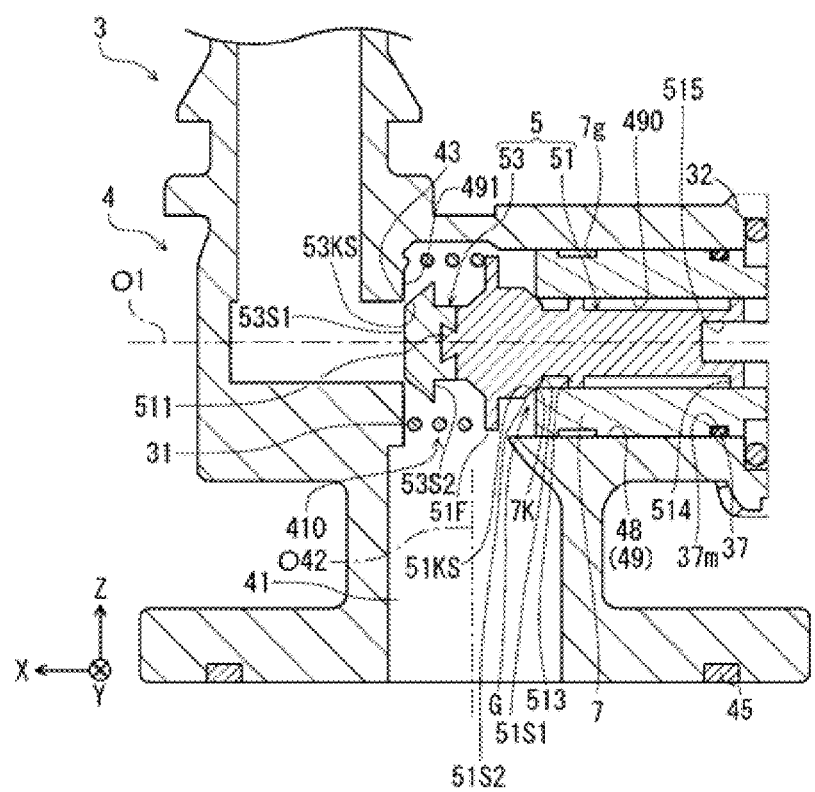
FIG. 4 is a diagram illustrating a state in which a flow path of the solenoid valve device of the technology of the present disclosure is opened.
Figure 5:
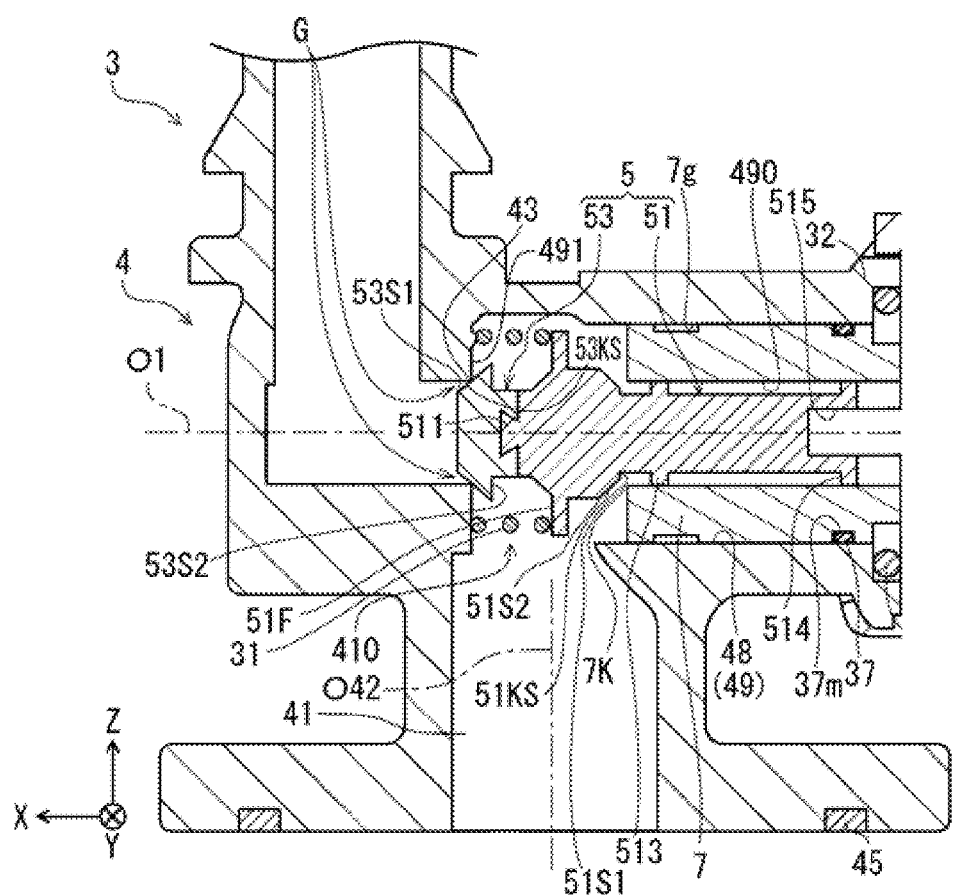
FIG. 5 is a diagram illustrating a state in which a flow path of the solenoid valve device of the technology of the present disclosure is closed by a valve body.

A configuration of an embodiment of a solenoid valve device of the technology of the present disclosure will be described with reference to FIGS. 1 to 5. FIG. 1 is a diagram illustrating an example of a use state (open state) of a solenoid valve device of the technology of the present disclosure. FIG. 2 is a diagram illustrating an example of a use state (closed state) of the solenoid valve device of the technology of the present disclosure. FIG. 3A is a cross-sectional view (open state) illustrating an embodiment of the solenoid valve device of the technology of the present disclosure. FIG. 3B is a cross-sectional view illustrating a cross-sectional shape of a first guide portion. FIG. 4 is a diagram illustrating a state in which a flow path of the solenoid valve device of the technology of the present disclosure is opened. FIG. 5 is a diagram illustrating a state in which the flow path of the solenoid valve device of the technology of the present disclosure is closed by a valve body.

The X-axis direction is an example of an "axial direction" of the technology of the present disclosure. The positive side in the X-axis direction is an example of "one side in the axial direction" of the technology of the present disclosure. The negative side in the X-axis direction is an example of "the other side in the axial direction" of the technology of the present disclosure.

As illustrated in FIGS. 1 and 2, a solenoid valve device 1 is used by being mounted on a vehicle 100 including an internal combustion engine 10 such as an engine, for example.

The internal combustion engine 10 includes a housing 11 having a combustion chamber 111, a crank chamber 112, and a buffer chamber 113, a piston 12 movably provided in the combustion chamber 111, and a crank 13 provided in the crank chamber 112 to convert reciprocating motion of the piston 12 into rotational motion.

In the housing 11, the crank chamber 112 and the buffer chamber 113 are connected via an internal flow path 114.

To the combustion chamber 111, an external flow path 14 is connected from the outside of the housing 11. A solenoid valve device 15 that is a throttle valve is provided in the middle of the external flow path 14.

The downstream side from the solenoid valve device 15 of the external flow path 14 and the crank chamber 112 are connected via a first auxiliary flow path 16.

A solenoid valve device 17 that is a PCV valve is provided in the middle of the first auxiliary flow path 16.

The upstream side from the solenoid valve device 15 of the external flow path 14 and the buffer chamber 113 are connected via a second auxiliary flow path 18. In the second auxiliary flow path 18, the solenoid valve device 1 is provided at a boundary portion with the external flow path 14.

The solenoid valve device 1 is an example of a "solenoid valve device" of the technology of the present disclosure.

The solenoid valve device 1 is a valve that switches open and close of the external flow path 14. In the solenoid valve device 1, the external flow path 14 is set to an open state (see FIG. 1) at the time of normal traveling of the vehicle 100, and the external flow path 14 is set to a closed state (see FIG. 2) at the time of leak detection for detecting leakage of air-fuel mixture AR or the like (hereinafter, also simply referred to as "leakage").

As shown in FIG. 1, in the open state, the air-fuel mixture AR passes through the external flow path 14, flows into the combustion chamber 111, and is subjected to combustion. The piston 12 moves due to the combustion of the air-fuel mixture AR.

A part of the air-fuel mixture AR passing through the external flow path 14 flows into the second auxiliary flow path 18 from the middle of the external flow path 14, and sequentially passes through the buffer chamber 113 and the internal flow path 114 to reach the crank chamber 112.

The air-fuel mixture AR having flown into the crank chamber 112 can return to the external flow path 14 via the first auxiliary flow path 16.

As illustrated in FIG. 2, in the closed state, the supply of the air-fuel mixture AR to the internal combustion engine 10 is stopped.

When the combustion chamber 111 has high pressure due to combustion of the air-fuel mixture AR, a part of a blow-by gas Q in the combustion chamber 111 passes through the piston 12 to flow into the crank chamber 112.

Thereafter, the blow-by gas Q in the crank chamber 112 flows into the external flow path 14 via the first auxiliary flow path 16.

At this time, when no leakage occurs, pressure in the crank chamber 112 decreases with time. When the pressure in the crank chamber 112 falls below a threshold value, it is determined that no leakage has occurred.

In contrast, in the case where leakage occurs, the pressure in the crank chamber 112 does not decrease and does not fall below the threshold value, or the decrease tendency of the pressure becomes gentle, and it takes time to fall below the threshold value. In this case, it is determined that the leakage has occurred.

Next, the solenoid valve device 1 will be described in detail. As illustrated in FIG. 3A, the solenoid valve device 1 includes a nozzle body 3 and a solenoid 2. The nozzle body 3 includes a suction side flow path 41 and a discharge side flow path 42, which will be described in detail later, and includes a valve body housing portion 49 that houses a valve body 5 that opens and closes the suction side flow path 41 and the discharge side flow path 42. The solenoid 2 drives the valve body 5 in the axial direction. The solenoid 2 is disposed on the negative side in the X-axis direction. The nozzle body 3 is disposed on the positive side in the X-axis direction.

The nozzle body 3 is an example of a "nozzle body" of the technology of the present disclosure. The solenoid 2 is an example of a "solenoid" of the technology of the present disclosure.

Hereinafter, a configuration of each part will be described. First, the configuration of the solenoid 2 will be described.

The solenoid 2 includes a bobbin 21, a plunger 22, a coil 23, a case 24, a core 25, and a yoke 26.

The plunger 22 moves in the axial direction by excitation of the coil 23.

The coil 23 is an example of a "coil" of the technology of the present disclosure. The plunger 22 is an example of a "plunger" of the technology of the present disclosure.

The bobbin 21 is a tubular member provided with a through-hole 211. The through-hole 211 penetrates along the X-axis direction. The through-hole 211 has an inner diameter that is constant along the X-axis direction.

The bobbin 21 includes a flange 212 protruding in the radial direction on the positive side in the X-axis direction, and includes a flange 213 protruding in the radial direction on the negative side in the X-axis direction.

The bobbin 21 is made of, for example, various kinds of resin material such as polyester or polyimide.

A coil 23 formed by winding a conductive wire is disposed on an outer peripheral portion 214 of the bobbin 21.

When the coil 23 is energized, a magnetic circuit is formed by the bobbin 21, the core 25, and the yoke 26, thereby generating a magnetic force. This enables the plunger 22 to move along the X-axis direction.

The core 25 and the yoke 26 are inserted into the through-hole 211 of the bobbin 21, and the plunger 22 is further inserted inside these. In other words, each of the core 25 and the yoke 26 is disposed between the bobbin 21 and the plunger 22.

The core 25 is disposed on the positive side in the X-axis direction, and the yoke 26 is disposed on the negative side in the X-axis direction.

The core 25 has a cylindrical shape or a tubular shape as a whole, and is disposed along the X-axis direction. The yoke 26 also has a cylindrical shape or a tubular shape as a whole, and is disposed along the X-axis direction.

The core 25 and the yoke 26 are each made of a soft magnetic material (soft magnetic metal material) such as iron. As a result, it is possible to generate a magnetic circuit in a level allowing the plunger 22 to move sufficiently.

The solenoid 2 includes a coupling member 201 that couples the core 25 and the yoke 26 in a separated state in the X-axis direction in the through-hole 211. The coupling member 201 has a cylindrical shape, and allows an end portion of the core 25 on the negative side in the X-axis direction and an end portion of the yoke 26 on the positive side in the X-axis direction to be fitted therein.

The coupling member 201 is made of a non-magnetic material having resistance to rust (for example, a metal material such as austenitic stainless steel).

The plunger 22 is disposed to straddle the core 25 and the yoke 26, and is supported to be alternately movable to the positive side and the negative side (that is, to be able to reciprocate) along the X-axis direction.

The plunger 22 includes a cylindrical plunger body 222 and a plunger pin 221 inserted in the plunger body 222. The plunger pin 221 protrudes on both the positive and negative sides in the X-axis direction.

The plunger 22 is configured such that the plunger pin 221 is supported by a bush 202 in the core 25, and the plunger pin 221 is supported by a bush 203 in the yoke 26. This enables the plunger 22 to smoothly reciprocate.

The case 24 houses the bobbin 21, the plunger 22, the coil 23, the core 25, and the yoke 26. The case 24 includes a case body 241, a connector member 242, and a ring member 243.

The case body 241 is a bottomed tubular member including a tubular frame portion 241*a* extending along the X-axis direction and a wall portion 241*b* closing the frame portion 241*a* on the negative side in the X-axis direction. The yoke 26 comes into contact with the wall portion 241*b* from the positive side in the X-axis direction.

The valve body 5 is biased toward the negative side in the X-axis direction by a coil spring 31 to be described later, and the plunger pin 221 comes into contact with (collides with) the wall portion 241*b* in a state (open state) where the flow path opening 43 is opened, whereby the movement of the plunger 22 toward the negative side in the X-axis direction is restricted.

The ring member 243 has an annular shape, and is disposed on the radially outer side of the core 25 to be concentric with the core 25. The ring member 243 is in contact with the core 25 from the positive side in the X-axis direction.

The case body 241 and the ring member 243 are each made of, for example, a soft magnetic metal material such as iron similarly to the core 25.

The connector member 242 is connected with a connector (not illustrated) used for energizing the coil 23. The connector member 242 is made of, for example, a resin material, which is similar to the bobbin 21.

The solenoid 2 includes a gasket 204, disposed between the ring member 243 and the flange 212 of the bobbin 21, and a gasket 205, disposed between the wall portion 241*b* of the case body 241 and the flange 213 of the bobbin 21, which are provided in the case 24.

The gasket 204 has a ring shape, and is disposed on an outer peripheral side of the core 25 to be concentric with the core 25. The gasket 204 is in a compressed state between the ring member 243 and the flange 212 of the bobbin 21. As a result, the gasket 204 airtightly seals a gap between the ring member 243 and the flange 212.

The gasket 205 has a ring shape, and is disposed on the radially outer side of the yoke 26 to be concentric with the yoke 26. The gasket 205 is in a compressed state between the wall portion 241*b* of the case body 241 and the flange 213 of the bobbin 21. As a result, the gasket 205 airtightly seals a gap between the wall portion 241*b* and the flange 213.

The gasket 204 and the gasket 205 are each made of an elastic material. The elastic material is not particularly limited, and examples thereof include various rubber materials such as urethane rubber and silicone rubber.

Next, the nozzle body 3 will be described.

The nozzle body 3 includes a flow path member 4, a valve body 5, a tubular valve body holding member 7 having an opening 7K on the positive side in the X-axis direction and having an outer peripheral surface, a coil spring (biasing member) 31, and a gasket 33.

The tubular valve body holding member 7 is an example of a "tubular valve body holding member" of the technology of the present disclosure.

The flow path member 4 is coupled to the solenoid 2 on the positive side in the X-axis direction. Note that the flow path member 4 is made of, for example, a resin material, which is similar to the bobbin 21.

The flow path member 4 includes a suction side flow path 41 and a discharge side flow path 42.

The suction side flow path 41 is an example of a "suction side flow path" of the technology of the present disclosure. The discharge side flow path 42 is an example of a "discharge side flow path" of the technology of the present disclosure.

The suction side flow path 41 extends in the Z-axis direction (direction intersecting the X-axis direction) and opens toward the negative side in the Z-axis direction. The suction side flow path 41 is connected to the external flow path 14 (see also FIG. 1), and is connected to the combustion chamber 111 via the external flow path 14.

The flow path member 4 is provided with a gasket 45 fitted from the outside to airtightly seal the gap between the flow path member 4 and a pipe constituting the external flow path 14.

The discharge side flow path 42 also extends in the Z-axis direction (direction intersecting the X-axis direction) and opens toward the positive side in the Z-axis direction.

A central axis O42 of the discharge side flow path 42 is located on the positive side in the X-axis direction with respect to a central axis O41 of the suction side flow path 41.

The discharge side flow path 42 is connected to, for example, the second auxiliary flow path 18 (see also FIG. 1).

Further, the flow path member 4 includes a valve body housing portion 49 including a tubular space 48 having a constant diameter along the X-axis direction. The tubular valve body holding member 7 is accommodated in the tubular space 48. The outer peripheral surface of the tubular valve body holding member 7 and the tubular inner peripheral surface of the tubular space 48 are in contact with each other. The negative side of the valve body 5 in the X-axis direction is supported by the tubular valve body holding member 7 so as to be movable in the X-axis direction.

On the nozzle body 3, a seal member 37 that seals a gap between the tubular valve body holding member 7 and the valve body housing portion 49 is disposed. Specifically, at least one of the outer peripheral surface of the tubular valve body holding member 7 and the tubular inner peripheral surface of the tubular space 48, that is, in the example illustrated in FIG. 3A, the outer peripheral surface of the tubular valve body holding member 7, is provided with a seal member peripheral groove 37*m* on the negative side in the X-axis direction. The seal member peripheral groove 37m is provided with the seal member 37. The seal member 37 is provided to seal so that the blow-by gas does not flow to the outside of the tubular valve body holding member 7. As will be described in detail later, when the flow path opening 43 is opened by a flow path open and close part 53KS, the opening open and close part 51KS closes an opening 7K of the tubular valve body holding member 7, so that the deposit can be prevented from flowing from the suction side flow path 41 to the tubular space 48 and eventually to the solenoid 2 side. However, when the blow-by gas actively flows to the outside of the tubular valve body holding member 7, the effect of preventing the deposit from flowing to the solenoid 2 side due to the opening open and close part 51KS closing the opening 7K of the tubular valve body holding member 7 is lost. Therefore, the seal member 37 seals so that the blow-by gas does not flow to the outside of the tubular valve body holding member 7. The seal member 37 is, for example, an O-ring made of rubber.

At least one of the outer peripheral surface of the tubular valve body holding member 7 and the tubular inner peripheral surface of the tubular space 48, or in the example illustrated in FIG. 3A, the outer peripheral surface of the tubular valve body holding member 7 is provided with a peripheral groove 7g on the positive side in the X-axis direction. Further, as described above, the seal member peripheral groove 37m is provided on the negative side in the X-axis direction on the outer peripheral surface of the tubular valve body holding member 7.

Therefore, firstly, since the outer peripheral surface of the tubular valve body holding member 7 includes the peripheral groove 7g and the seal member peripheral groove 37m, the sliding resistance of the outer peripheral surface of the tubular valve body holding member 7 with the tubular inner peripheral surface of the tubular space 48 can be reduced, and the tubular valve body holding member 7 can be easily inserted into the tubular space 48.

In addition, with a portion (first portion) on the positive side in the X-axis direction with respect to the peripheral groove 7g and a portion (second portion) on the negative side in the X-axis direction with respect to the seal member peripheral groove 37m on the outer peripheral surface of the tubular valve body holding member 7, the tubular valve body holding member 7 can be supported in the tubular space 48. By adjusting the length of each of the first portion and the second portion, it is possible to facilitate dimensional management of the inclination amount of the tubular valve body holding member 7.

The suction side flow path 41 is connected to the tubular space 48 from the negative side in the Z-axis direction via the opening 41O, and the discharge side flow path 42 is connected to the tubular space 48 from the X side in the X-axis direction X via the flow path opening 43. Therefore, the suction side flow path 41 and the discharge side flow path 42 are connected to each other via the flow path opening 43.

For example, when the internal combustion engine 10 on which the solenoid valve device 1 is mounted is a natural intake type engine, the blow-by gas Q flows from the suction side flow path 41 toward the discharge side flow path 42 through the tubular space 48 and the flow path opening 43 in order.

As illustrated in FIG. 3A, the flow path member 4 has a ring-shaped coupling portion 32 at its end on the negative side in the X-axis direction. The case body 241 of the solenoid 2 is fixed to the coupling portion 32 by, for example, caulking. As a result, the solenoid 2 and the flow path member 4 are coupled.

The gasket 33 is disposed in a compressed state between the coupling portion 32 and the ring member 243 of the solenoid 2. The gasket 33 has a ring shape and is disposed concentrically with the tubular space 46.

Due to the presence of the gasket 33, the gap between the coupling portion 32 and the ring member 243 is airtightly sealed. As a result, it is possible to prevent the blow-by gas Q from leaking from the gap between the flow path member 4 and the solenoid 2.

Note that the gasket 33 is made of, for example, an elastic material such as urethane rubber, which is similar to the gasket 204.

The valve body 5 can move along the X-axis direction together with the plunger 22. The flow path opening 43 can be opened and closed by the movement of the valve body 5.

In a state where the valve body 5 opens the flow path opening 43 (open state), the blow-by gas Q can pass from the suction side flow path 41 toward the discharge side flow path 42. Here, FIGS. 3A and 4 illustrate an open state of the valve body 5.

On the other hand, in a state where the valve body 5 closes the flow path opening 43 (closed state (see also FIG. 5)), the passage of the blow-by gas Q from the suction side flow path 41 toward the discharge side flow path 42 is blocked.

The valve body 5 includes a main body portion 51 and a valve portion 53.

The main body portion 51 includes a flange portion 51F, an opening open and close part 51KS that opens and closes the opening 7K of the tubular valve body holding member 7, and a columnar portion 51C.

The flange portion 51F is located on the positive side in the X-axis direction, and the columnar portion 51C is located on the negative side in the X-axis direction.

The opening open and close part 51KS is positioned between the positive side end and the negative side end of the valve body 5 in the X-axis direction, specifically, between the flange portion 51F and the columnar portion 51C.

The opening open and close part 51KS has, for example, a tapered shape in which the diameter gradually decreases toward the negative side in the X-axis direction. The outer diameter of a surface 51S1 at the negative side end of the opening open and close part 51KS in the X-axis direction is smaller than the inner diameter of the opening 7K, and the outer diameter of a surface 51S2 at the positive side end of the opening open and close part 51KS in the X-axis direction is larger than the inner diameter of the opening 7K. The opening open and close part 51KS includes a portion having an outer diameter equal to the inner diameter of the opening 7K between the surface 51S1 and the surface 51S2.

When the end on the negative side in the X axis direction enters the opening 7K with the portion having an outer diameter equal to the inner diameter of the opening 7K entering up to the position of the inner diameter of the opening 7K, the opening open and close part 51KS closes the opening 7K. When the valve body 5 moves to the positive side in the X-axis direction from this state, the opening open and close part 51KS opens the opening 7K.

The opening open and close part 51KS is an example of an "opening open and close part" of the technology of the present disclosure.

The main body portion 51 is disposed in the valve body housing portion 49 (tubular space 48) in a posture in which the central axis of the columnar portion 51C is along the X-axis direction. The main body portion 51 is made of a lightweight metal material such as aluminum.

The columnar portion 51C of the main body portion 51 includes a plurality of first guide portions 513 and a plurality of second guide portions 514.

The first guide portions 513 are provided on the positive side in the X-axis direction on an outer periphery of the columnar portion 51C of the main body portion 51.

As illustrated in FIG. 3B, a plurality of (for example, four) first guide portions 513 are continuously provided along the circumferential direction of the columnar portion 51C of the main body portion 51. The number of the first guide portions 513 is not limited to four. The number of the first guide portions 513 may be three, five, six, or the like.

Each of the plurality of first guide portions 513 protrudes in the radial direction K from the outer periphery of the columnar portion 51C of the main body portion 51 to an inner wall 490 of the tubular valve body holding member 7, and is guided by the inner wall 490 of the tubular valve body holding member 7.

Each of the plurality of first guide portions 513 is formed of a flange portion. The contour of the cross section (that is, a cross section perpendicular to the axis O1 direction (X-axis direction)) of a portion 513T in contact with the inner wall 490 of the tubular valve body holding member 7 of each of the plurality of first guide portions 513 is a curve. Specifically, the portion 513T is a protruding end portion protruding toward the inner wall 490, and more specifically, is a portion having rounded corners. Therefore, the valve body 5 can be easily slid.

Each of the plurality of first guide portions 513 slides while being guided by the inner wall 490 of the tubular valve body holding member 7 when the valve body 5 moves along the X-axis direction. Therefore, the valve body 5 can move stably.

The second guide portions 514 are provided on the negative side in the X-axis direction with respect to the plurality of first guide portions 513 on the outer periphery of the columnar portion 51C of the main body portion 51. A plurality of (for example, four) second guide portions 514 is continuously provided along the circumferential direction of the columnar portion 51C of the main body portion 51. The number of the second guide portions 514 may be three, five, six, or the like. The second guide portion 514 has the same shape as the first guide portion 513. Therefore, the valve body 5 can be easily slid.

In a state where the valve body 5 closes the flow path opening 43 (closed state), the second guide portion 514 is located on the negative side in the X-axis direction with respect to the opening 410 where the suction side flow path 41 is connected to the tubular space 48. This makes it possible to reliably prevent the valve body 5 from falling to the suction side flow path 41.

Similarly to the first guide portion 513, the second guide portion 514 may be formed of a flange portion (first configuration) or may be formed of a piece portion (second configuration).

In the case of the first configuration, the stability of the posture can be enhanced when the valve body 5 moves.

In the case of the second configuration, since the contact area between the second guide portion 514 and the inner wall 490 of the valve body housing portion 49 is reduced, the slidability of the valve body 5 can be easily enhanced.

The inner wall 490 of the tubular valve body holding member 7 forms a flat surface. That is, the inner wall 490 has no unevenness, step difference, or the like. Therefore, the first guide portions 513 can uniformly come into contact along the circumferential direction of the inner wall 490.

In the main body portion 51, a recessed portion 515 recessed toward the positive side in the X-axis direction is formed at an end portion on the negative side in the X-axis direction thereof.

The plunger pin 221 enters the recessed portion 515 such that an end of the plunger pin 221 on the positive side in the X-axis direction abuts on a bottom surface of the recessed portion 515, and presses the valve body 5 (main body portion 51) toward the positive side in the X-axis direction. With the pressing by the plunger 22, it is possible to move the valve body 5 to close the flow path opening 43 with the valve body 5.

The valve portion 53 is disposed on the positive side in the X-axis direction of the main body portion 51. A flow path open and close part 53KS is provided on the positive side in the X-axis direction of the valve portion 53. Along with the movement with the plunger 22, the flow path open and close part 53KS approaches the flow path opening 43 to close the flow path opening 43, and separates from the flow path opening 43 to open the flow path opening 43. As described above, the valve portion 53 has a function of opening and closing the flow path opening 43 by the flow path open and close part 53KS.

The flow path open and close part 53KS is an example of a "flow path open and close part" of the technology of the present disclosure.

The valve portion 53 is fixed to a mounting portion 511 that protrudes from the main body portion 51 to the positive side in the X-axis direction.

The valve portion 53 is made of, for example, an elastic material such as urethane rubber similarly to the gasket 204.

The flow path open and close part 53KS of the valve portion 53 has, for example, a tapered shape in which the diameter gradually decreases toward the positive side in the X-axis direction. The outer diameter of the surface 53S1 at the positive side end in the X-axis direction of the flow path open and close part 53KS is smaller than the inner diameter of the flow path opening 43. The outer diameter of the surface 532 at the negative side end in the X-axis direction of the flow path open and close part 53KS is larger than the inner diameter of the flow path opening 43. The flow path open and close part 53KS includes a portion having an outer diameter equal to the inner diameter of the flow path opening 43 between the surface 53S1 and a surface 53S2.

When the end on the positive side in the X-axis direction enters the flow path opening 43 with the portion having an outer diameter equal to the inner diameter of the flow path opening 43 entering up to the position of the inner diameter of the flow path opening 43, the flow path open and close part 53KS closes the flow path opening 43. When the valve body 5 moves to the negative side in the X-axis direction from this state, the flow path open and close part 53KS opens the flow path opening 43.

The outer diameter of the portion of the flow path open and close part 53KS that closes the flow path opening 43 is equal to the inner diameter of the flow path opening 43, and the outer diameter of the portion of the opening open and close part 51KS that closes the opening 7K is equal to the inner diameter of the opening 7K. If the inner diameter of the flow path opening 43 and the inner diameter of the opening 7K are different, the flow path open and close part 53KS and the opening open and close part 51KS have the same shape and different diameters.

A coil spring 31 is provided along the X-axis direction on the positive side in the X-axis direction with respect to the valve body 5. The coil spring 31 is a biasing member that biases the valve body 5 to the negative side in the X-axis direction.

When the energization of the coil 23 is released, the valve body 5 can move to the negative side in the X-axis direction by being biased by the coil spring 31. As a result, the valve portion 53 can be separated from the flow path opening 43 and open the flow path opening 43 to be in an open state.

The coil spring 31 is provided on the outer peripheral side of the valve body 5 concentrically with the valve body 5 between the flange portion 51F of the main body portion 51 and the end surface 491 on the positive side in the X-axis direction of the valve body housing portion 49. The positive side in the X-axis direction of the coil spring 31 is in contact with the end surface 491 on the positive side in the X-axis direction of the valve body housing portion 49. The negative side in the X axis direction comes into contact with the flange portion 51F of the main body portion 51 to be in a compressed state. As a result, the coil spring 31 can stably bias the valve body 5 without excess or deficiency.

Next, the operation of the solenoid valve device 1 of the present embodiment will be described.

During normal traveling of the vehicle 100, the solenoid valve device 1 opens the external flow path 14 (see FIG. 1).

As illustrated in FIG. 4, the valve body 5 is biased toward the negative side in the X-axis direction by the coil spring 31 as described above, the valve body 5 moves toward the negative side in the X-axis direction, the flow path open and close part 53KS is separated from the flow path opening 43, and the flow path opening 43 is in an open state (open state).

When the valve body 5 moves to the negative side in the X-axis direction, the opening open and close part 51KS closes the opening 7K of the tubular valve body holding member 7.

As described above, when the flow path opening 43 is opened by the flow path open and close part 53KS, the opening open and close part 51KS closes the opening 7K of the tubular valve body holding member 7.

As described above, when the flow path opening 43 is opened by the flow path open and close part 53KS, the blow-by gas Q can pass from the suction side flow path 41 toward the discharge side flow path 42, and a deposit G tends to flow into the tubular space 48 from the suction side flow path 41.

However, the opening open and close part 51KS closes the opening 7K of the tubular valve body holding member 7. Therefore, the opening open and close part 51KS prevents the deposit from flowing into the tubular space 48 from the suction side flow path 41.

At the time of leakage detection to detect leakage of the air-fuel mixture AR or the like, the solenoid valve device 1 closes the external flow path 14 (see FIG. 2).

As illustrated in FIG. 5, when the external flow path 14 is closed, the solenoid valve device 1 energizes the coil 23. When the coil 23 is energized, a magnetic circuit is formed by the bobbin 21, the core 25, and the yoke 26, and a magnetic force is generated. Thereby, the plunger 22 is moved along the X-axis direction. More specifically, an end of the plunger pin 221 on the positive side in the X-axis direction presses the bottom surface of the recessed portion 515, and the plunger pin 221 presses the valve body 5 (main body portion 51) toward the positive side in the X-axis direction. With the movement of the valve body 5 toward the positive side in the X-axis direction, the flow path open and close part 53KS approaches the flow path opening 43 and closes the flow path opening 43.

The blow-by gas Q does not flow into the suction side flow path 41. The deposit G may flow from the discharge side flow path 42 toward the suction side flow path 41.

However, the flow path open and close part 53KS closes the flow path opening 43. Therefore, the deposit is prevented from flowing into the tubular space 48.

As described above, the solenoid valve device 1 of the present embodiment can prevent deposits from flowing into the solenoid 2 side.

As described above, when the flow path opening 43 is opened by the flow path open and close part 53KS, the opening open and close part 51KS closes the opening 7K of the tubular valve body holding member 7, so that deposits can be prevented from flowing from the suction side flow path 41 to the tubular space 48 and eventually to the solenoid 2 side. The seal member 37 is provided. Therefore, the blow-by gas can be prevented from flowing to the outside of the tubular valve body holding member 7.

The columnar portion 51C of the main body portion 51 includes a plurality of first guide portions 513 and a plurality of second guide portions 514. The first guide portions 513 and the second guide portions 514 each protrude in the radial direction K from the outer periphery of the columnar portion 51C of the main body portion 51 to the inner wall 490 of the tubular valve body holding member 7, and are guided by the inner wall 490 of the tubular valve body holding member 7. In each of the first guide portions 513 and each of the second guide portions 514, the contour of the cross section (that is, a cross section perpendicular to the axis O1 direction (X-axis direction)) of the portion 513T in contact with the inner wall 490 of the tubular valve body holding member 7 is a curve. Therefore, the valve body 5 can be easily slid.

While the solenoid valve device of the technology of the present disclosure has been described with respect to the illustrated embodiment, the technology of the present disclosure is not limited thereto, and each part constituting the solenoid valve device can be replaced with a part having an arbitrary configuration capable of exhibiting a similar function. Further, any component may be added.

Further, while the solenoid valve device 1 is used by being mounted on the vehicle 100 including the internal combustion engine 10 such as an engine in the above embodiment, the application place of the solenoid valve device is not limited to the vehicle 100. Further, the fluid that is switched between passage and interruption by the solenoid valve device 1 is not limited to the gas (blow-by gas Q), and may be a liquid or a mixture of a gas and a liquid.

Further, the solenoid valve device 1 has a configuration in which the blow-by gas Q flows from the suction side flow path 41 toward the discharge side flow path 42 in the embodiment. However, the solenoid valve device 1 may have a configuration in which the blow-by gas Q flows from the discharge side flow path 42 toward the suction side flow path 41 depending on the use state of the solenoid valve device 1.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A solenoid valve device comprising:
a nozzle body including a suction side flow path and a discharge side flow path, and including a valve body housing portion that houses a valve body, the valve body opening and closing the suction side flow path and the discharge side flow path; and
a solenoid that drives the valve body in an axial direction, wherein
the solenoid includes a plunger that moves in the axial direction by excitation of a coil,
the nozzle body includes a tubular valve body holding member having an opening on one side in the axial direction,
another side in the axial direction of the valve body is supported by the tubular valve body holding member so as to be movable in the axial direction,
the suction side flow path and the discharge side flow path are connected to each other via a flow path opening,
the valve body includes, on one side in the axial direction of the valve body, a flow path open and close part that opens and closes the flow path opening,
the valve body includes, between an end on the one side and an end on the other side in the axial direction of the valve body, an opening open and close part that opens and closes the opening of the tubular valve body holding member,
an outer periphery on the one side in the axial direction of the valve body includes a plurality of first guide portions that protrudes from the outer periphery to an inner wall of the tubular valve body holding member and is guided by the inner wall of the tubular valve body holding member,
an outer periphery on the other side in the axial direction of the valve body includes a plurality of second guide portions that protrude from the outer periphery to the inner wall of the tubular valve body holding member, is guided by the inner wall of the tubular valve body holding member, and is disposed on the other side in the axial direction of the valve body from the plurality of first guide portions,
a contour of a cross section perpendicular to the axial direction of a portion in contact with the inner wall of the tubular valve body holding member of each of the plurality of first guide portions and the plurality of second guide portions is a curve, and
a seal member that seals a gap between the tubular valve body holding member and the valve body housing portion is disposed between the tubular valve body holding member and the valve body housing portion.

2. The solenoid valve device according to claim 1, wherein the opening open and close part closes the opening of the tubular valve body holding member when the flow path opening is opened by the flow path open and close part.

3. The solenoid valve device according to claim 1, wherein
the valve body housing portion includes a tubular space,
the tubular valve body holding member includes an outer peripheral surface,
the tubular valve body holding member is housed in the tubular space of the valve body housing portion,
the outer peripheral surface of the tubular valve body holding member and a tubular inner peripheral surface of the tubular space are in contact with each other,
at least one of the tubular inner peripheral surface and the outer peripheral surface includes a seal member peripheral groove on the other side in the axial direction of the valve body, and
a seal member is provided in the seal member peripheral groove.

4. The solenoid valve device according to claim 1, wherein the seal member is an O-ring made of rubber.

5. The solenoid valve device according to claim 3, wherein at least one of the tubular inner peripheral surface and the outer peripheral surface includes a peripheral groove on the one side in the axial direction of the valve body.

6. The solenoid valve device according to claim 1, wherein
the flow path open and close part has a tapered shape in which a diameter gradually decreases toward the one side in the axial direction,
an outer diameter of an end on the one side in the axial direction of the flow path open and close part is smaller than an inner diameter of the flow path opening, and
an outer diameter of an end on the other side in the axial direction of the flow path open and close part is larger than the inner diameter of the flow path opening.

7. The solenoid valve device according to claim 1, wherein
the opening open and close part has a tapered shape in which a diameter gradually decreases toward the other side in the axial direction,
an outer diameter of an end on the other side in the axial direction of the opening open and close part is smaller than an inner diameter of the opening, and
an outer diameter of an end on the one side in the axial direction of the opening open and close part is larger than the inner diameter of the opening.

* * * * *